(12) United States Patent  
Giovannini et al.

(10) Patent No.: US 12,321,943 B2  
(45) Date of Patent: Jun. 3, 2025

(54) LOCATING SUSPECT TRANSACTION PATTERNS IN FINANCIAL NETWORKS

(71) Applicant: International Business Machines Corporation, Armonk, NY (US)

(72) Inventors: Andrea Giovannini, Zurich (CH); Tamas Visegrady, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 17/568,001

(22) Filed: Jan. 4, 2022

(65) Prior Publication Data

US 2023/0214842 A1    Jul. 6, 2023

(51) Int. Cl.  
    *G06Q 20/40*      (2012.01)  
    *G06N 3/08*      (2023.01)

(52) U.S. Cl.  
    CPC ........... *G06Q 20/4016* (2013.01); *G06N 3/08* (2013.01)

(58) Field of Classification Search  
None  
See application file for complete search history.

(56) References Cited

U.S. PATENT DOCUMENTS

| | | | |
|---|---|---|---|
| 7,458,508 B1 * | 12/2008 | Shao | ........... G06Q 20/04 235/380 |
| 7,708,638 B2 | 5/2010 | Enzminger | |
| 8,751,399 B2 | 6/2014 | Kolhatkar | |
| 10,685,355 B2 | 6/2020 | Novick | |
| 11,019,090 B1 * | 5/2021 | Smith | ........... G06F 21/40 |
| 2006/0149674 A1 * | 7/2006 | Cook | ........... G06Q 40/02 705/44 |

(Continued)

FOREIGN PATENT DOCUMENTS

| | | | |
|---|---|---|---|
| CN | 110400220 A | 11/2019 | |
| CN | 111292195 A | 6/2020 | |

(Continued)

OTHER PUBLICATIONS

"An Algorithmic Framework for Identifying Structures of Interest in Temporal, People-to-People Money Exchange Networks", An IP.com Prior Art Database Technical Disclosure, Authors et. al.: Disclosed Anonymously, IP.com No. IPCOM000224130D, IP.com Electronic Publication Date: Dec. 11, 2012, 6 pages.

(Continued)

*Primary Examiner* — Peter D Nolan  
*Assistant Examiner* — Matthew Cobb  
(74) *Attorney, Agent, or Firm* — Nicholas A. Welling

(57) ABSTRACT

An approach for locating suspect patterns of transactions in a financial network may be provided. The approach may include generating a transaction graph for a financial network by processing transaction data defining transfers between accounts in that network. The approach may include modifying the transaction graph to include synthetic suspect transaction patterns at multiple locations in the graph and extracting subgraphs from the transaction graph. The approach may include training a graph neural network model to classify subgraphs containing a synthetic suspect transaction pattern as suspect. The approach may also include locating suspect transaction patterns in a new financial network by generating a new transaction graph for that network and classifying a subgraph of the new financial network as suspect.

15 Claims, 10 Drawing Sheets

(56) References Cited

U.S. PATENT DOCUMENTS

| | | | |
|---|---|---|---|
| 2015/0262185 | A1 | 9/2015 | Abe |
| 2019/0164164 | A1 | 5/2019 | Karambakkam |
| 2019/0378050 | A1* | 12/2019 | Edkin .................... G06N 20/20 |
| 2020/0167786 | A1* | 5/2020 | Kursun .................. H04L 63/08 |
| 2020/0169483 | A1* | 5/2020 | Kursun .............. G06Q 20/3678 |
| 2020/0285944 | A1* | 9/2020 | Lee ..................... G06F 16/9024 |
| 2021/0176260 | A1* | 6/2021 | Pan ........................ G06N 5/022 |
| 2021/0233080 | A1* | 7/2021 | Shekhar ................ G06N 3/084 |
| 2022/0020026 | A1* | 1/2022 | Wadhwa ................ G06N 5/022 |
| 2023/0206241 | A1* | 6/2023 | Kayathwal ........... G06Q 20/065 705/75 |

FOREIGN PATENT DOCUMENTS

| | | | | |
|---|---|---|---|---|
| CN | 111340509 | A | * | 6/2020 |
| EP | 3975092 | A1 | * | 3/2022 .............. G06N 3/08 |
| JP | 6549183 | B2 | | 7/2019 |

OTHER PUBLICATIONS

Chandra et al., "Graph-based Modeling of Online Communities for Fake News Detection", arXiv:2008.06274v4 [cs.CL] Nov. 23, 2020, 16 pages.

Dou et al., "Enhancing Graph Neural Network-based Fraud Detectors against Camouflaged Fraudsters", arXiv:2008.08692v1 [cs.SI] Aug. 19, 2020, 10 pages.

Hu et al., "Characterizing and Detecting Money Laundering Activities on the Bitcoin Network", arXiv:1912.12060v1 [cs.SI] Dec. 27, 2019, 17 pages.

Jiang et al., "Anomaly Detection with Graph Convolutional Networks for Insider Threat and Fraud Detection", MILCOM 201—2019 IEEE Military Communications Conference (MILCOM), Mar. 5, 2020, 6 pages, <http://169.237.7.61/pubs/PID6150935_GCN.pdf>.

Li et al., "Classifying and Understanding Financial Data Using Graph Neural Network", Association for the Advancement of Artificial Intelligence, 2020, 8 pages, <https://aaai-kdf2020.github.io/assets/pdfs/kdf2020_paper_21.pdf>.

Lopez-Rojas et al., "Money Laundering Detection using Synthetic Data", The 27th annual workshop of the Swedish Artificial Intelligence Society, May 2012, 9 pages, <https://www.researchgate.net/publication/224952602>.

Lv et al., "A RBF Neural Network Model for Anti-Money Laundering", Proceedings of the 2008 International Conference on Wavelet Analysis and Pattern Recognition, Hong Kong, Aug. 30-31, 2008, 8 pages.

Nhien An Le Khac et al., "A data mining-based solution for detecting suspicious money laundering cases in an investment bank", 2010 Second International Conference on Advances in Databases, Knowledge, and Data Applications, Jun. 3, 2020, 6 pages, <https://arxiv.org/ftp/arxiv/papers/1609/1609.00990.pdf>.

Wang et al., "APAN: Asynchronous Propagation Attention Network for Real-time Temporal Graph Embedding", arXiv:2011.11545v4 [cs.AI] Mar. 26, 2021, 11 pages.

Weber et al., "Anti-Money Laundering in Bitcoin: Experimenting with Graph Convolutional Networks for Financial Forensics", arXiv:1908.02591v1 [cs.SI] Jul. 31, 2019, 7 pages.

Weber et al., "Scalable Graph Learning for Anti-Money Laundering: A First Look", NeurIPS 2018 Workshop on Challenges and Opportunities for AI in Financial Services: the Impact of Fairness, Explainability, Accuracy, and Privacy, Montréal, Canada, 7 pages, <https://www.researchgate.net/publication/329388432>.

Xu et al., Towards Consumer Loan Fraud Detection: Graph Neural Networks with Role-Constrained Conditional Random Field, 2021, The Thirty-Fifth AAAI Conference on Artificial Intelligence (AAAI-21), 9 pages.

* cited by examiner

LOCATING SUSPECT TRANSACTION PATTERNS IN FINANCIAL NETWORKS

BACKGROUND

The present invention relates generally to locating suspect transaction patterns in financial networks. An approach for locating suspect patterns of transactions in financial networks, together with systems and computer program products implementing such methods.

Transactions in financial networks (e.g., networks of computers implementing transfers between accounts in a bank, consortium of banks and/or other money processing system) are commonly monitored with the aim of detecting fraudulent activity, such as money laundering or trader fraud. Conventional anti-money laundering (AML) procedures rely on heuristics derived from a priori knowledge of fraudulent transactions. Automated methods for detection of illicit transfers are primarily based on data tagging, origin-tracing systems, or well-defined heuristics to detect known, preprogramed patterns of fraud. Origin-tracing systems require iterative manual steps, do not scale well to large networks, and generally extrapolate from a priori knowledge in line with conventional AML procedures. Practical approaches to AML automation in large networks are also limited by embedded a priori knowledge, essentially amounting to pattern matching using only hardwired rules based on well-defined heuristics. As typical examples, AML systems might be specialized to detect unnatural concentrations of transfer amounts close to particular cash-transaction limits, or to look for concentrations of identical incoming/outgoing transfer amounts. Embedding parameters such as specific transaction limits in AML systems means that these systems are not readily portable to other networks. Moreover, reliance on hardwired rules based on known fraud patterns makes these systems relatively easy to circumvent. Known systems typically also focus on identifying individual accounts showing suspect activity. However, individual transactions in any one account may appear entirely legal, while a group of connected transactions over multiple accounts may be fraudulent. Such systems may therefore fail to detect partitioned, but clearly fraudulent, groups of related transactions.

In view of the above, improved techniques for detecting suspect activity in financial networks would be highly desirable.

SUMMARY

One aspect of the present invention provides a computer-implemented method for locating suspect patterns of transactions in a financial network. The method includes generating a transaction graph for a reference financial network by processing transaction data defining transfers between accounts in that network. The transaction graph comprises nodes, representing respective accounts, interconnected by edges representing transfers between accounts represented by the nodes. The graph also includes, for each node, a set of vectors of transaction values, the transaction values in each vector being dependent on accumulated transfer amounts, in respective successive time intervals, from that node to a respective neighboring node in the graph. The method also includes modifying the transaction graph to include synthetic suspect transaction patterns at multiple locations in the graph, and then extracting subgraphs from the transaction graph. Each subgraph comprises a randomly-selected node and a selected group of nodes reachable from that node via edges in the transaction graph. The subgraphs are used to train a graph neural network model to classify subgraphs containing a synthetic suspect transaction pattern as suspect. The method further comprises locating suspect transaction patterns in a new financial network by generating a new transaction graph, as defined above, for that network, extracting new subgraphs, as defined above, from the new transaction graph, and supplying the new subgraphs to the model for classification. An output is provided indicating any new subgraph which is classified as suspect.

Methods embodying the invention build upon the realization that certain patterns are present in aggregate characteristics of networks of transfers, and these patterns can provide indicators of fraud without relying on hardwired rules. A specialized data structure is constructed in the form of a transaction graph, based on real transactions in the reference financial network with synthetic suspect patterns imposed on the graph, where transaction information is embedded in sets of "transaction vectors" for each node. The elements of a transaction vector for a node comprise values dependent on accumulated transfer amounts, in successive time intervals, between that node and a neighboring node in the graph. The transaction vectors thus provide temporally-summarized embeddings of transactions between nodes, allowing subsequent processes to focus on aggregated, rather than individual, transactions. Moreover, the set of transaction vectors for a node constitutes a matrix of transaction values encoding temporally summarized activity between that node and its various neighbors in the graph. These matrices provide an elegant representation of aggregate characteristics of nodes in the transaction graph, and can be processed highly efficiently in ensuing method steps. Subgraphs extracted from the resulting graph data structure are further processed via message passing in the graph neural network (GNN) model, whereby the resulting embeddings encode qualitative, not purely quantitative, properties of transaction patterns in the graph. By training the GNN model to detect the subgraphs containing the synthetic suspect patterns, the resulting GNN can be applied to any new financial network, and can detect potentially fraudulent, aggregate transaction patterns unlimited by predefined limits or hardwired AML heuristics. This represents a significant advance for detection of fraud in financial networks.

In response to an output indicating a new subgraph classified as suspect, the subgraph may be further analyzed to identify particular nodes and/or transactions involved in the suspect pattern. While such analysis may be performed, at least in part, by a system operator, preferred embodiments can identify suspect nodes automatically. These embodiments use the subgraphs extracted from the transaction graph for the reference financial network to train a further GNN model to classify nodes involved in a synthetic suspect transaction patterns as suspect nodes. New subgraphs extracted from the transaction graph for a new financial network are then supplied to this further GNN model for classification of the subgraph nodes, and an output is provided indicating any nodes classified as suspect.

Advantageously, in response to classification of a new subgraph as suspect, embodiments of the invention may initiate an action in the new financial network. Such an action may comprise at least one of: sending an alert, indicating accounts corresponding to nodes in the subgraph, to a network controller in the financial network; flagging accounts corresponding to nodes in the subgraph for monitoring in the financial network; and freezing accounts corresponding to nodes in the subgraph.

Particularly preferred methods use a technique for extracting subgraphs from the transaction graphs in which the boundary, or "graph cut", defining the subgraph is dynamically determined based on analysis of node metadata, i.e., the sets of transaction vectors for nodes. These methods select the aforementioned group of nodes in each subgraph by initially selecting all nodes up to a boundary reached by a predetermined number of hops in the graph from the randomly-selected node. Then, for each neighboring node, outside the boundary, of each node on the boundary, these embodiments decide whether to move the boundary to that neighboring node in dependence on a function F of the set of vectors for that node and the sets of vectors for a predefined set of nodes in the graph. This process is performed iteratively for the boundary nodes until a stop condition is satisfied. Conveniently, the function F can use the node metadata to compare the distribution of transaction values in the set of vectors for the neighboring node outside the boundary with the distribution of transaction values calculated over the sets of vectors for the predefined set of nodes. This predefined set of nodes may comprise the set of nodes on the current boundary, whereby the boundary is moved, or not, in dependence on difference between the distribution for the neighboring node and the distribution over the boundary nodes. For example, if the neighbor's distribution is similar to the boundary node distribution, indicating a possible correlation in transaction activity, then the boundary may be moved to include the neighbor node. In addition, or as an alternative, the function F may check whether the neighbor node's activity is notably different to a typical node in the graph, indicating unusual activity. Exemplary implementations here are described further below. These features allow subgraphs to be defined dynamically so as to include nodes whose behavior is of interest, indicating potential involvement in a suspect transaction pattern.

When modifying the transaction graph for the reference network to include a synthetic suspect transaction pattern, preferred embodiments provide a pattern graph, comprising nodes representing accounts involved in the pattern and edges representing transfers between those accounts, for the transaction pattern. This pattern graph includes, for each node, at least one transfer amount transferred from that node to a respective neighboring node in the pattern graph. For example, such transfer amounts may be encoded in transaction vectors, as described above, for nodes of the pattern graph. The pattern graph can be compared with patterns of transaction values for nodes in the transaction graph for the reference network to identify corresponding transaction patterns in the transaction graph. The transaction graph is then modified such that each corresponding transaction pattern so identified matches the pattern in the pattern graph. These features, explained further below, allow synthetic patterns to be imposed on the transaction graph while restricting overall modification of the graph, thus inhibiting obfuscation of real transaction data in the graph.

Methods embodying the invention may be implemented dynamically in a financial network by receiving transaction data from the network and periodically regenerating and analyzing the new transaction graph for the network. Embodiments may also employ various other advantageous techniques, including: techniques for augmenting predefined "seed patterns" for suspect transactions to obtain additional synthetic patterns to be imposed on the transaction graph; applying heuristics-based rules to impose additional synthetic patterns on the graph; and providing additional metadata in transaction graphs, e.g., encodings of additional transaction data in the temporal and/or frequency domain, to make this available to the message passing process in the GNN. These and other features and advantages of methods embodying the invention will be described in more detail below.

Another aspect of the invention provides a system for locating suspect patterns of transactions in a financial network. The system comprises: a graph generator adapted to generate a transaction graph for a reference financial network as described above; a graph modifier adapted to modify the transaction graph to include synthetic suspect transaction patterns at multiple locations in the graph; a subgraph extractor adapted to extract subgraphs from the transaction graph as described above; a model generator adapted to use the subgraphs to train a graph neural network model as described above; and a system controller adapted to locate suspect transaction patterns in a new financial network by controlling the graph generator to generate a new transaction graph for that network, controlling the subgraph extractor to extract new subgraphs from the new transaction graph, and supplying the new subgraphs to the model for classification, wherein the system controller provides an output indicating any new subgraph classified as suspect.

A further aspect of the invention provides a computer program product comprising a computer readable storage medium embodying program instructions, executable by a computing system, to cause the computing system to implement a method described above for locating suspect patterns of transactions in a financial network.

Embodiments of the invention will be described in more detail below, by way of illustrative and non-limiting example, with reference to the accompanying drawings.

DETAILED DESCRIPTION

Figure 1:
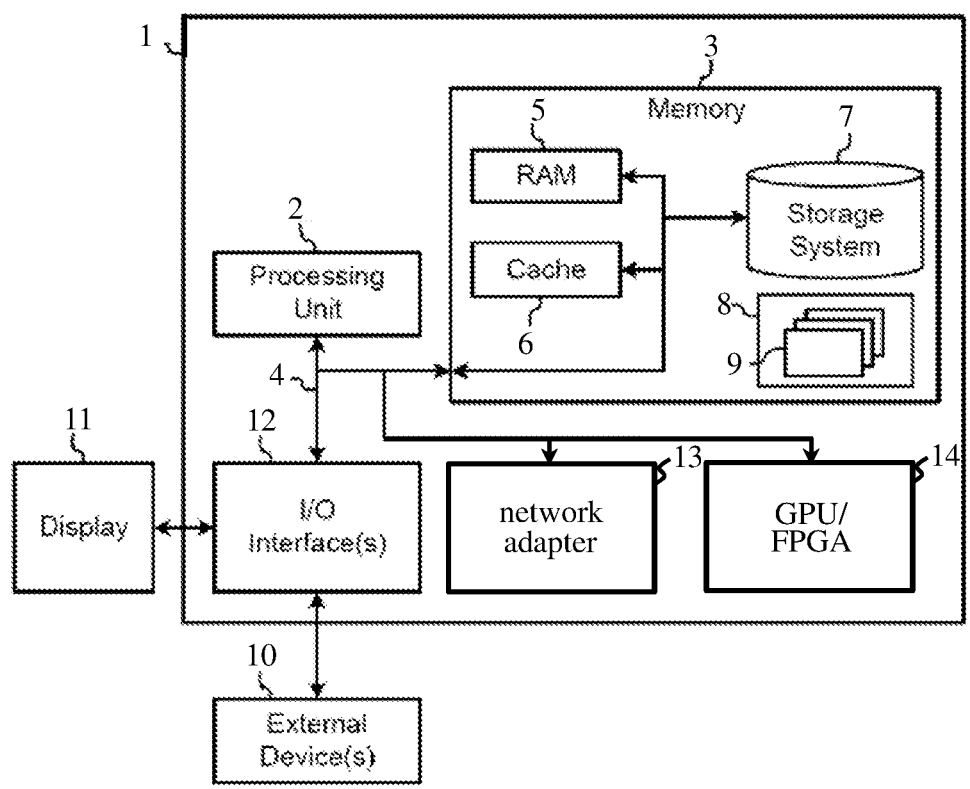
FIG. 1 is a schematic representation of a computing system for implementing methods embodying the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments to be described can be performed as computer-implemented methods for locating suspect transaction patterns in a financial network. Such methods may be implemented by a computing system comprising one or more general- or special-purpose computers, each of which may comprise one or more (real or virtual) machines, providing functionality for implementing operations described herein. Steps of methods embodying the invention may be implemented by program instructions, e.g., program modules, implemented by a processing apparatus of the system. Generally, program modules may include routines, programs, objects, components, logic, data structures, and so on that perform particular tasks or implement particular abstract data types. The computing system may be implemented in a distributed computing environment, such as a cloud computing environment, where tasks are performed by remote processing devices that are linked through a communications network. In a distributed computing environment, program modules may be located in both local and remote computer system storage media including memory storage devices.

FIG. 1 is a block diagram of exemplary computing apparatus for implementing methods embodying the invention. The computing apparatus is shown in the form of a general-purpose computer 1. The components of computer 1 may include processing apparatus such as one or more processors represented by processing unit 2, a system memory 3, and a bus 4 that couples various system components including system memory 3 to processing unit 2.

Bus 4 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 1 typically includes a variety of computer readable media. Such media may be any available media that is accessible by computer 1 including volatile and non-volatile media, and removable and non-removable media. For example, system memory 3 can include computer readable media in the form of volatile memory, such as random access memory (RAM) 5 and/or cache memory 6. Computer 1 may further include other removable/non-removable, volatile/non-volatile computer system storage media. By way of example only, storage system 7 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 4 by one or more data media interfaces.

Memory 3 may include at least one program product having one or more program modules that are configured to carry out functions of embodiments of the invention. By way of example, program/utility 8, having a set (at least one) of program modules 9, may be stored in memory 3, as well as an operating system, one or more application programs, other program modules, and program data. Each of the operating system, one or more application programs, other program modules, and program data, or some combination thereof, may include an implementation of a networking environment. Program modules 9 generally carry out the functions and/or methodologies of embodiments of the invention as described herein.

Computer 1 may also communicate with: one or more external devices 10 such as a keyboard, a pointing device, a display 11, etc.; one or more devices that enable a user to interact with computer 1; and/or any devices (e.g., network card, modem, etc.) that enable computer 1 to communicate with one or more other computing devices. Such communication can occur via Input/Output (I/O) interfaces 12. Also, computer 1 can communicate with one or more networks such as a local area network (LAN), a general wide area network (WAN), and/or a public network (e.g., the Internet) via network adapter 13. As depicted, network adapter 13 communicates with the other components of computer 1 via bus 4. Computer 1 may also communicate with additional processing apparatus 14, such as a GPU (graphics processing unit) or FPGA, for implementing embodiments of the invention. It should be understood that although not shown, other hardware and/or software components could be used in conjunction with computer 1. Examples include, but are not limited to: microcode, device drivers, redundant processing units, external disk drive arrays, RAID systems, tape drives, and data archival storage systems, etc.

Figure 2:
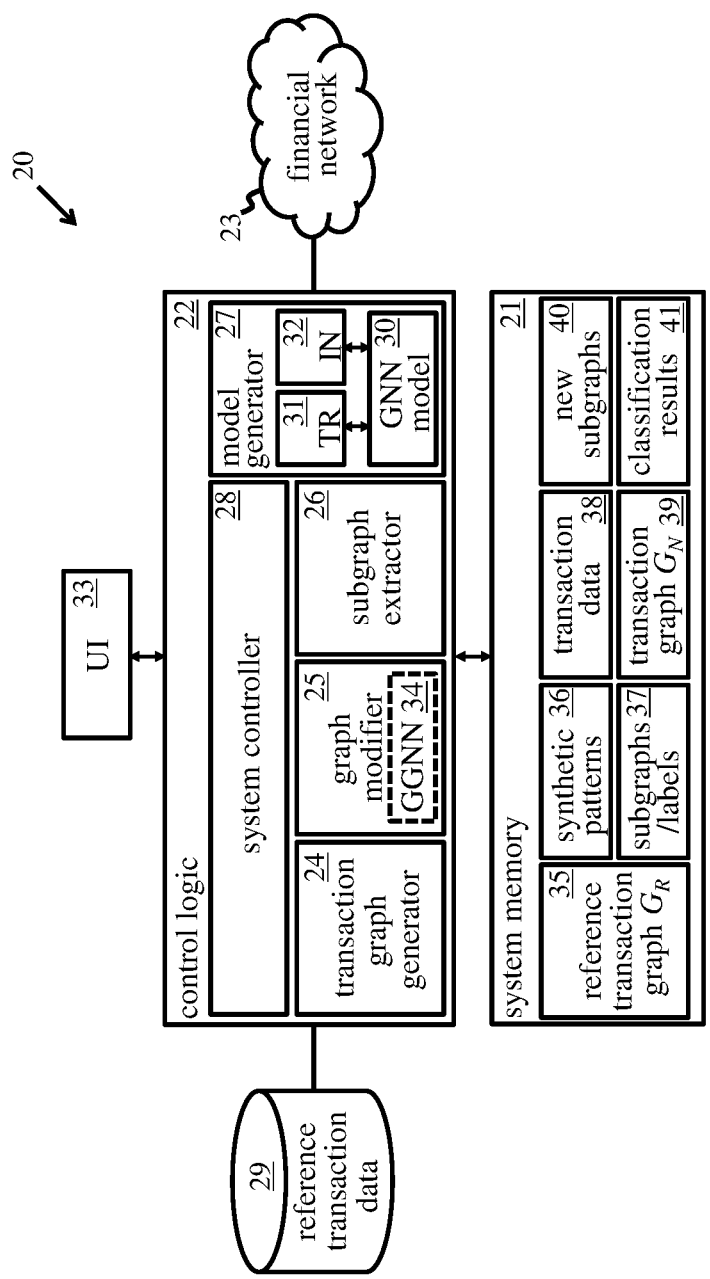
FIG. 2 illustrates component modules of a computing system for locating suspect transaction patterns in a financial network.

The FIG. 2 schematic illustrates component modules of an exemplary computing system for implementing methods embodying the invention. The system 20 comprises memory 21 and control logic, indicated generally at 22, comprising functionality for locating suspect transaction patterns in a financial network 23. Control logic 22 comprises a transaction graph generator 24, a graph modifier 25, a subgraph extractor 26, a model generator 27, and a system controller 28. Each of these logic modules comprises functionality for implementing particular steps of a suspect pattern detection process detailed below. During this process, the graph generator 24 processes a dataset 29 of reference transaction data, defining transfers between accounts in a reference financial network, to generate a transaction graph described below. The model generator 27 trains, and subsequently deploys, at least one GNN model 30 using a training (TR) module 31 and an inference (IN) module 32 for the model. The system controller 28 controls operation of modules 24 through 27 at various stages of the process, and communicates with a user interface (UI) 33, displayed at one or more user computers, for user interactions with the system and presentation of processing results. As illustrated in dashed lines in the figure, graph modifier 25 may employ a further, generative GNN model (GGNN) 34 in preferred embodiments below.

Logic modules 24 through 27 interface with memory 21 which stores various data structures used in operation of system 20. These data structures include a reference transaction graph ($G_R$) 35 produced by graph generator 24 from the transaction data 29, data defining a set of synthetic suspect transaction patterns 36 which are imposed on the transaction graph, and data defining a set of subgraphs 37 (with associated labels explained below) which are extracted from the resulting graph. These subgraphs are used by model generator 27 for training GNN model 30. After the training phase, transaction data received from financial network 23 is stored at 38 in memory 21, and a new transaction graph ($G_N$) 39 is generated for the network 23. New subgraphs 40 are extracted from this transaction graph, and these subgraphs are then classified by GNN model 30, yielding classification results 41.

In general, functionality of logic modules 24 through 27 may be implemented by software (e.g., program modules) or hardware or a combination thereof. Functionality described may be allocated differently between system modules in other embodiments, and functionality of one or more modules may be combined. The various components of system 20 may be provided in one or more computers of a computing system. For example, all modules may be provided in a computer 1 at which UI 33 is displayed to a user, or modules may be provided in one or more computers/servers to which user computers can connect via a network (which may comprise one or more component networks and/or internetworks, including the Internet). System 20 may be local or remote from the financial network 23 to be monitored, and may be integrated in the network in some embodiments. System memory 21 may be implemented by one or memory/storage components associated with one or more computers of system 20.

The reference transaction data 29 can be compiled from transaction records for accounts in a reference financial network, where this reference network may comprise one or more component networks for one or more banks, consortia of banks, and/or other monetary processing systems (including electronic transaction systems such as the Bitcoin transaction network) in which transfers are made between user accounts. This transaction data can be compiled over a period of time such as a number of months (e.g., a financial quarter), a financial year, or longer periods of multiple years for which transaction records are available. Preferred embodiments use transaction data acquired over at least a year of operation of a large reference network comprising multiple component transaction networks. For each transaction, the reference transaction data comprises a sender account identifier, a receiver account identifier, a transfer amount and a transaction timestamp indicating date and time of the transaction. Additional data, such as an account type (e.g., private user account or company/business account) may also be provided and can be exploited by embodiments below. The reference transaction data 29 may be accessed dynamically from one or more remote databases, or may be precompiled for system operation and stored in system memory 21.

Figure 3:
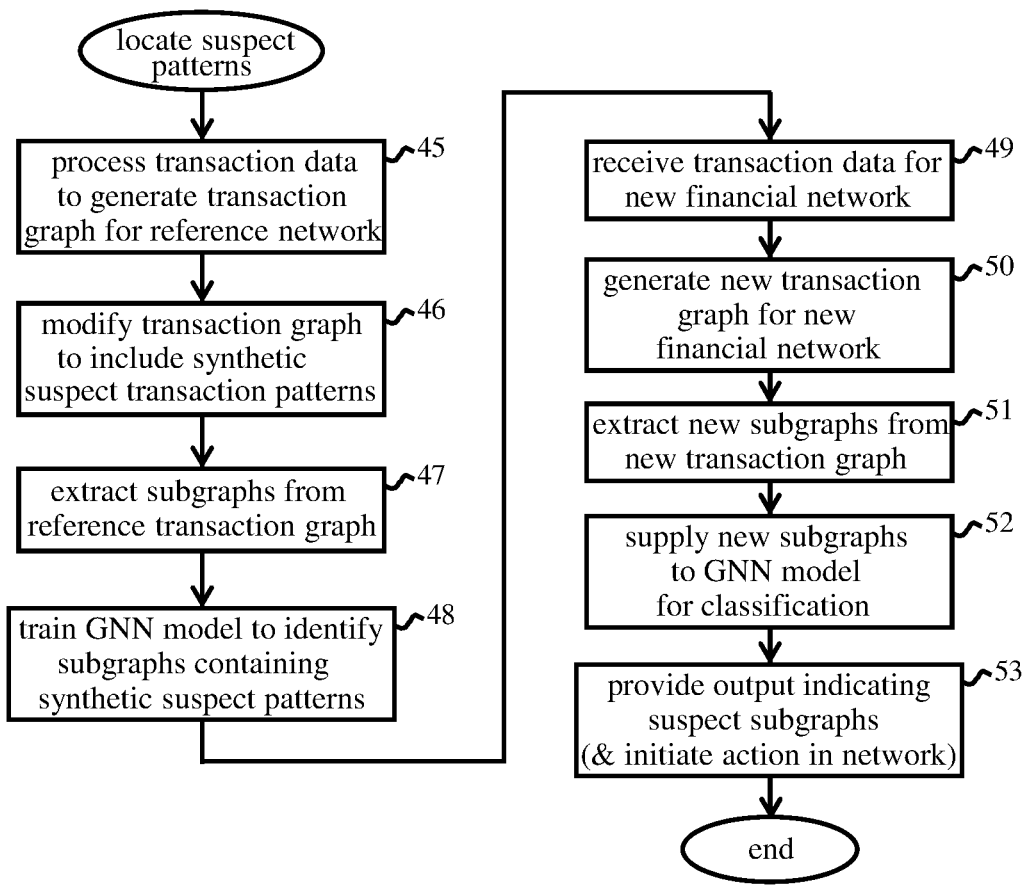
FIG. 3 indicates steps performed in operation of the FIG. 2 system.
Figure 4:
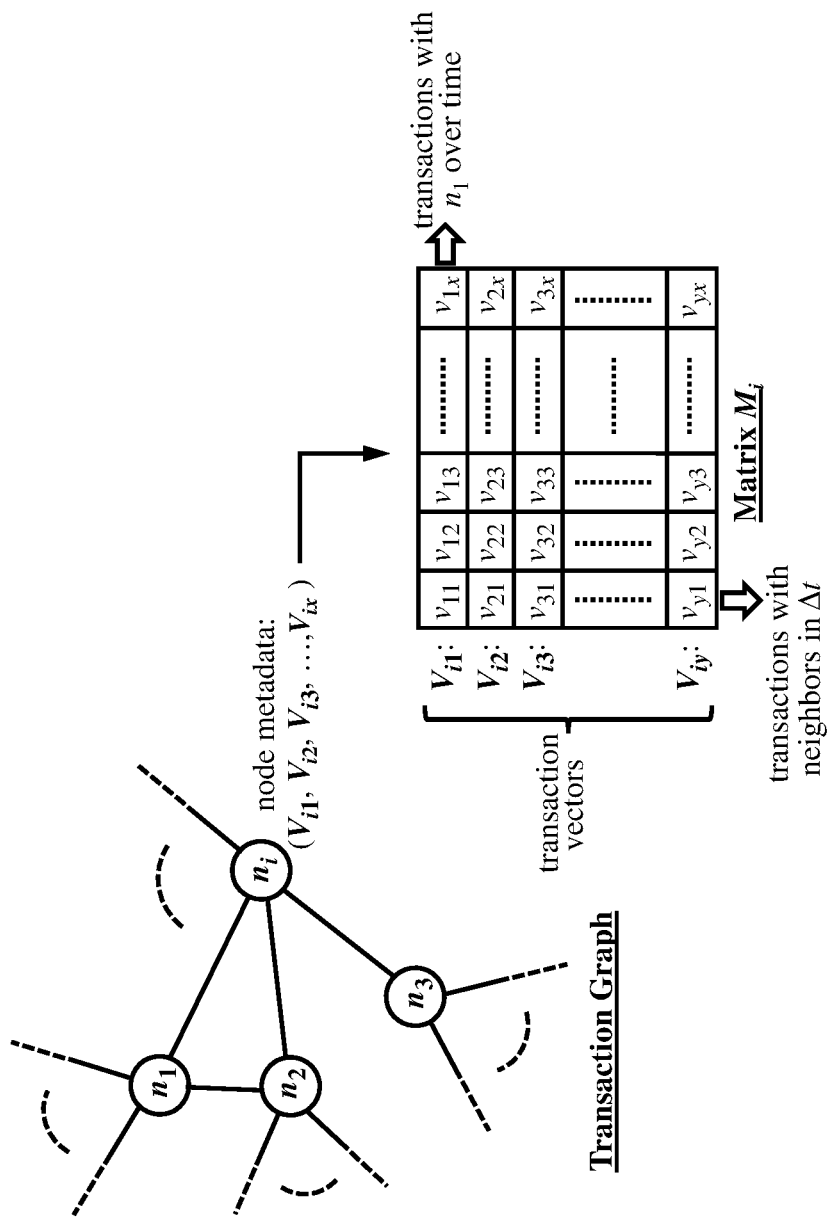
FIG. 4 is a schematic illustrating structure of a transaction graph generated by the system.

FIG. 3 indicates basic steps in operation of system 20. In step 45, graph generator 24 processes the reference transaction data 29 to generate the reference transaction graph $G_R$. Basic structure of this transaction graph is illustrated in FIG. 4. The transaction graph $G_R$ comprises nodes, indicated by circles, interconnected by edges indicated by lines between nodes. Nodes (labeled $n_i$, $n_1$, $n_2$, $n_3$ in the partial view shown) represent respective accounts in the reference financial network. Edges represent transfers between accounts represented by the nodes. In the example shown, edges from node $n_i$ to each of nodes $n_1$, $n_2$ and $n_3$ indicate that money was transferred between account $n_i$ and accounts $n_1$, $n_2$ and $n_3$ during the monitoring period for the reference network. The transaction graph also includes node metadata for each node in the graph. This metadata comprises a set of vectors of transaction values (referred to herein as "transaction vectors"), denoted by $V_{i1}, \ldots, V_{iy}$ for node $n_i$ in the figure. Each transaction vector comprises a series of x transaction values which are dependent on accumulated transfer amounts, in respective successive time intervals $\Delta t$, from the associated node to a respective neighboring node (i.e., a node reachable via a single edge) in the graph. In preferred embodiments here, a transaction value is calculated as a simple sum of the amounts transferred to the neighboring node in the time interval $\Delta t$. Hence: transaction vector $V_{i1}$ comprises transaction values $v_{11}, v_{12}, v_{13}, \ldots, v_{1x}$ summing transfer amounts from $n_i$ to neighboring node $n_1$ in x successive time intervals $\Delta t$; transaction vector $V_{i2}$ comprises transaction values $v_{21}, v_{22}, v_{23}, \ldots, v_{2x}$ summing transfer amounts from $n_i$ to neighbor $n_2$ in these time intervals $\Delta t$; and so on up to vector $V_{iy}$ for the $y^{th}$ neighbor node $n_y$. The value of y here can be selected as appropriate for the reference financial network, e.g., as the maximum number of neighbors of any node to retain all information, or as the average number of neighbors for a node if desirable to simplify processing. If any given node has less than y neighbors, its metadata will contain some all-zero vectors. If a node has more than y neighbors, then y neighbor nodes may be selected in various ways, e.g., by selecting y neighbors at random or the y neighbors with which the current node is most active. The time interval $\Delta t$ and the dimension x can also be set as appropriate for the market in question and the reference financial data available. The interval $\Delta t$ is preferably selected to accommodate typical money-laundering pattern timings, typically of the order of several days. The dimension x can then be set to encompass all, or a representative sample, of the transaction data, e.g., a year or financial quarter of transactions. By way of example, transaction vectors may contain of the order of tens of values, and a dimension y of the order of tens of neighbors can be readily accommodated in the system.

As FIG. 4 illustrates, the resulting set of transaction vectors for a node $n_i$ constitutes a y-by-x matrix $M_i$ of transaction values (referred to herein as a "transaction matrix"), which encodes the temporal evolution of transactions by node $n_i$ with its neighbors. Through this encoding, summing along a row of transaction matrix $M_i$ gives the sum of transactions executed by $n_i$ with a particular neighbor. Summing along a column gives the sum of transactions executed by $n_i$ with its neighbors in a particular time interval $\Delta t$. The transaction matrix thus provides an elegant representation of temporally summarized transaction activity of a node, and the resulting matrices can be processed very efficiently in processing steps below using simple matrix/vector operations. In particularly simple embodiments, the transaction graph $G_R$ for a reference network of N accounts can be fully defined by the transaction matrices $M_i$ for nodes $n_i$, i=1 to N, and an N-by-N binary adjacency matrix in which a "1" at position (p, q) in the matrix indicates presence of an edge between a node $n_p$ and a node $n_q$ in the graph. Transaction graphs may, however, encode additional data in nodes and/or edges as described below.

When the reference transaction graph 35 has been generated and stored in step 45 of FIG. 3, operation proceeds to step 46. Here, the graph modifier 25 modifies the transaction graph to include synthetic suspect transaction patterns at multiple locations in the graph. This step, which uses the set of synthetic patterns 36, is described in more detail below. In step 47, the subgraph extractor 26 extracts multiple subgraphs from the modified transaction graph. Each of these subgraphs comprises a randomly-selected node in transaction graph 35 and a selected group of nodes reachable from that node via edges in the transaction graph. The resulting subgraphs are defined by the node metadata (transaction matrices $M_i$) for component nodes and an adjacency matrix defining edges between node pairs. The subgraphs 37 are stored along with associated subgraph labels (representing "suspect" or "not suspect") which identify those subgraphs that contain a synthetic suspect pattern imposed in step 46. In step 48, model generator 27 uses the subgraphs 37 to train GNN model 30 to classify as suspect those subgraphs which contain a synthetic pattern. This model training operation is described below with reference to FIG. 5.

Figure 5:
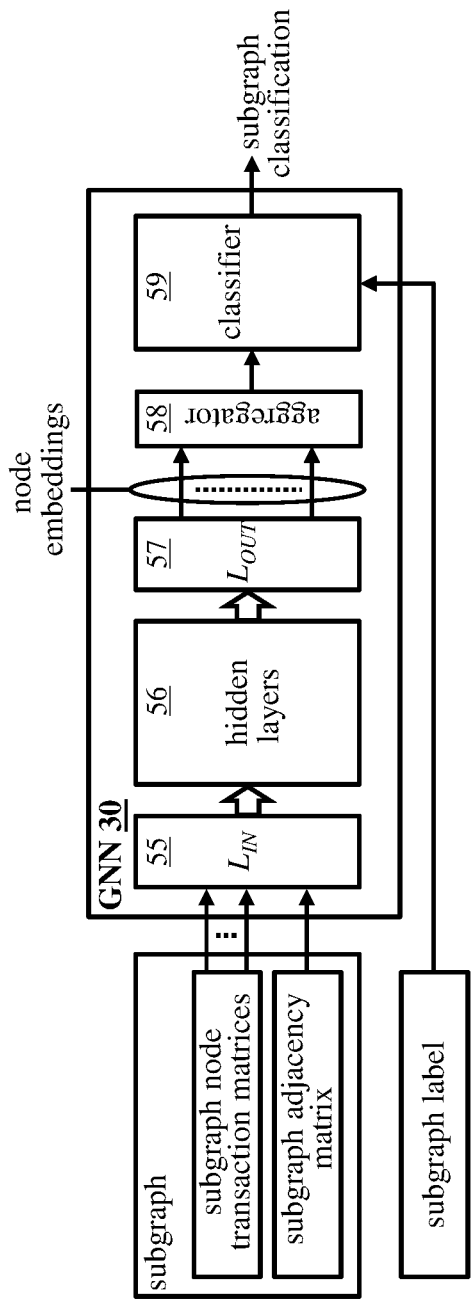
FIG. 5 illustrates training of a GNN model used for subgraph classification in the FIG. 2 system.

The GNN model 30 is adapted to receive input subgraphs and to produce node embeddings for the subgraph via a message passing process. Message passing (MP) is a well-known technique in GNN architectures via which "messages" are passed between nodes of a graph and the "state" of each node is iteratively updated based on the messages that node receives. The state of a node is defined by a feature vector, and a message is defined as some function of the feature vectors of that node's neighbors in the graph. The node state is then updated as some function of its current state and the received message. Messages are passed iteratively, whereby all node states are successively updated with each MP step to obtain the final node embeddings. In the example of FIG. 5, GNN model 30 comprises a layer $L_{IN}$ of input neurons 55, a plurality of "hidden" neuron layers 56, and a layer $L_{OUT}$ of output neurons 57. (The "neurons" can be implemented, in general, in hardware or software to perform the required MP calculations in each layer of the network). The input layer $L_{IN}$ receives the node transaction matrices and subgraph adjacency matrix defining an input subgraph. Neurons in this layer receive the initial feature vectors for respective nodes of the subgraph, where a feature vector can be obtained here by aggregating the node metadata, e.g., by concatenating the transaction vectors in the matrix $M_i$ for the node. (Sufficient neurons are provided in input layer $L_{IN}$ to accommodate the largest subgraph in the training set, with feature vectors being set to zero for any redundant input neurons for a given subgraph). Messages are then relayed through successive hidden layers 56 according to the subgraph adjacency matrix, and the node states are updated in each step according to the particular MP algorithm employed. Output layer 57 provides the final node states as the output node embeddings for the subgraph.

While the GNN layer structure can be based on any convenient GNN architecture, e.g., graph attention networks (GAT), message passing neural networks (MPNN), temporal graph networks (TGN), preferred embodiments employ a GCN (Graph Convolutional Network) architecture using Graph Isomorphism Network (GIN) layers. The number of hidden layers 56, and hence message passing steps, is determined based on dimensions of subgraphs in the training set, e.g., as the average number of nodes in the training subgraphs. A variety of MP algorithms may also be employed here, such as a sum of the node feature vectors, or a sum in combination with the computation of the divergence or curl, e.g., the sum of the curl of the node feature vectors to be aggregated during the message passing step.

The node embeddings output by the GNN are aggregated (e.g., concatenated or otherwise combined) in an aggregator module 58 to provide the final embedding for each subgraph. The subgraph embedding is input to a classifier 59 which can be implemented in known manner, conveniently as a simple feedforward neural network. Classifier 59 also receives the label, described above, for an input subgraph. Model 30 can thus be trained to correctly classify input subgraphs via a well-known supervised learning process. In this process, the TR module 31 of model generator 27, supplies subgraphs iteratively to the model, and the model parameters (e.g., neural network weights in the message passing layers) are progressively updated based on backpropagation of errors between the model output and the subgraph label. For this training operation, TR module 31 typically splits the training dataset into training, validation and test sets, where the training set is used for initial model training, the validation set is used to fine-tune model parameters, and the test set is used to assess final model performance.

Figure 6:
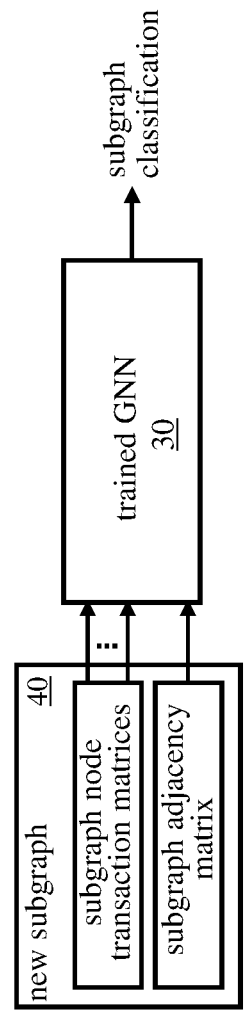
FIG. 6 illustrates application of the GNN classification model in analysis of a financial network.

When training of GNN model 30 is complete, system 20 can be applied to locate suspect transaction patterns in a new financial network 23. In step 49 of FIG. 3, the system controller 28 receives and stores transaction data for the network 23. This transaction data 38 defines transfers between accounts in network 23 as described above for reference transaction data 29. In step 50, system controller 28 controls graph generator 24 to generate a new transaction graph $G_N$ for the network 23 using the new transaction data 38. The new transaction graph $G_N$ is generated in the same way as reference transaction graph $G_R$, and thus includes a transaction matrix $M_i$ for each node $n_i$ in the graph (plus any additional metadata included in $G_R$ by embodiments below). The new transaction graph $G_N$ is stored at 39 in system memory 21. In step 51, the system controller controls subgraph extractor 26 to extract new subgraphs from the graph $G_N$ in like manner to subgraph extraction step 47 for the reference transaction graph. The new subgraphs are stored at 40 in system memory 21. In step 52, the system controller supplies the new subgraphs 40 to model generator 32 where inference module 32 then supplies each subgraph to model 30 for classification as illustrated in FIG. 6. The classification result (indicating "suspect" or "not suspect") for each subgraph is stored at 40 in system memory 21. Any subgraph which is classified as suspect is likely to contain a suspect transaction pattern, whereby the classification results 40 indicate locations of potentially fraudulent transaction patterns in the network 23. In step 53, the system controller provides an output to UI 33 indicating any new subgraph classified as suspect, and may also initiate certain actions in network 23 as explained below.

Figure 7:
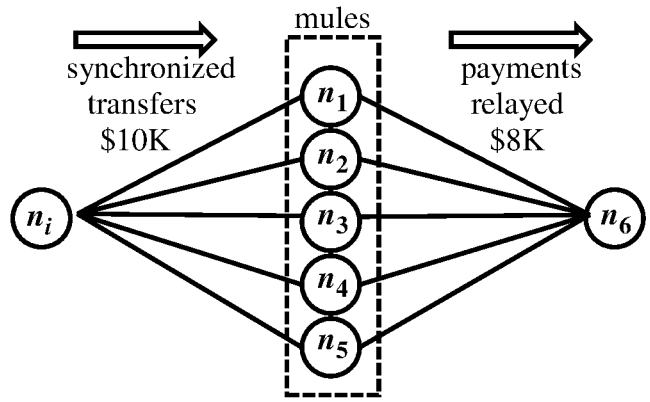
FIG. 7 is a schematic representation of a synthetic transaction pattern which can be imposed on the FIG. 4 graph.

A synthetic pattern 35 used in graph modification step 46 is conveniently defined by a "pattern graph" comprising nodes, representing respective accounts involved in the pattern, interconnected by edges representing transfers between these accounts. FIG. 7 shows structure of a pattern graph for one example of a money-laundering pattern, here a type of "layering" (or "smurfing") pattern. This pattern involves synchronized transfers of significant amounts, here equal $10K transfers, from a node $n_i$ to a group of "mules" (nodes $n_1$ to $n_5$) who subsequently relay correlated amounts, e.g., the incoming amount or that amount minus a transfer fee (here 20%), to another account (node $n_6$). The pattern graph includes node metadata (not shown explicitly in FIG. 7) for each node, where this node metadata comprises at least one transfer amount transferred from that node to a respective neighboring node in the pattern graph. In preferred embodiments here, these transfer amounts are encoded in sets of transaction vectors, as described above, for individual nodes of the pattern graph. While a specific example is shown in FIG. 7, multiple such patterns graphs can be defined for various implementations of numerous types of suspect transaction pattern. For example, pattern graphs can be defined for: synchronized transfers which cross multiple nodes, with equal or variable incoming/outgoing transfer amounts (to address layering with transfer amounts which are variable and therefore not directly correlated with each other); synchronized transfers which cross multiple nodes without otherwise significant activity; unnatural clusters of correlated transfer amounts or other indicators of quantization (without embedding specific quantization criteria based on transaction limits or reporting thresholds); nodes/groups of nodes which always deduct some function of otherwise simply forwarded transfers (addressing typical support models of Bitcoin-laundering 'mixers' and similar fraudulent services); sets of apparently unrelated transfers which together add up to particular round numbers of significance (e.g. 1 million dollars); and circular transaction patterns such as groups of variable numbers of nodes which circulate transfer amounts (addressing circulation of funds to fraudulently inflate revenues or comparable self-dealing between coordinated cliques, such as so-called 'wash trades').

In some embodiments, the entire set of synthetic patterns 35 might be predefined by AML experts. However, preferred embodiments below use techniques for augmenting a basic "seed set" of expert-defined patterns to generate additional synthetic patterns for inclusion in the graph. Graph modifier 25 may impose synthetic patterns on the transaction graph in various ways. As a simplistic example, a pattern involving m interconnected nodes might be imposed by selecting m similarly interconnected nodes in $G_R$ and adding the transfers in the synthetic pattern into the transaction matrices for these nodes. Preferred techniques for imposing the synthetic patterns on $G_R$ will be described in detail below. Each pattern 36 can be included at multiple locations in $G_R$, and patterns can be overlayed via multiple iterations of the graph modification process to provide a complex scenario for subsequent processing. For each instance of each pattern imposed on the graph, graph modifier 25 records the pattern location (i.e., the set of nodes involved in the pattern), e.g., by annotating nodes of $G_R$ with a pattern identifier for later identification of synthetic pattern locations.

In subgraph extraction step 47 of FIG. 3, a sufficient number S of subgraphs are extracted to provide an adequate training dataset for GNN model 30. By way of example, for a typical transaction graph with around 1 million nodes, a suitable training dataset may be compiled by extracting about S=50,000 subgraphs. The subgraph extractor 26 selects S nodes at random, and then defines each subgraph by following edges from a selected node to a group of nodes reachable from that node. This group of nodes might be selected in various ways, e.g., by selecting all nodes within a predetermined number j of hops (edge traversals) from the random node in a simplistic implementation. In preferred embodiments, subgraph extractor 26 uses a technique for defining the boundaries of subgraphs dynamically based on analysis of node metadata. This technique will be described further below. For each extracted subgraph, the subgraph extractor determines, based on the synthetic pattern locations recorded by graph modifier 25, whether each subgraph contains a synthetic transaction pattern. If a subgraph contains all nodes involved in any synthetic pattern, then that subgraph is labeled as "suspect". If not, the subgraph is labeled "not suspect".

When extracting subgraphs 39 from the new transaction graph $G_N$ in step 51 of FIG. 3, the number of subgraphs extracted can be determined based on the number of nodes in the graph $G_N$. Nodes in $G_N$ are selected at random, subgraphs are defined around these nodes as before, and the process continues until each node in $G_N$ has been included in at least one of the subgraphs so extracted.

In step 53 of FIG. 3, the system controller 28 may display each suspect subgraph, with its associated metadata, in the UI 33, or may otherwise identify accounts corresponding to nodes in the subgraph, with related transaction data, for inspection. The system controller may also initiate an action in the network 23 in response to classification of a new subgraph as suspect. Such an action may involve one or more of: sending an alert, indicating accounts corresponding to nodes in the suspect subgraph, to a network controller (e.g., an account monitoring server) in network 23; automatically flagging accounts, corresponding to nodes in the suspect subgraph, in the network for further monitoring by AML processes; and potentially even freezing accounts corresponding to nodes in the suspect subgraph, in particular where monitoring system 20 is integrated in the network 23.

It will be seen that the above system focusses on aggregate characteristics of patterns of transfers, based on temporally summarized transaction activity, in a transaction graph for a real financial network with embedded synthetic patterns of fraud. By training GNN model 30 on subgraphs extracted from this data structure, detection of suspect activity is based on qualitative, rather than quantitative, properties of transaction patterns. The resulting system can efficiently identify suspect transaction patterns in any financial network 23, unconstrained by predefined transaction limits or other hardwired AML heuristics. This not only offers improved detection of fraudulent activity, but also inhibits attempts by fraudsters to circumvent known AML processes.

Figure 8:
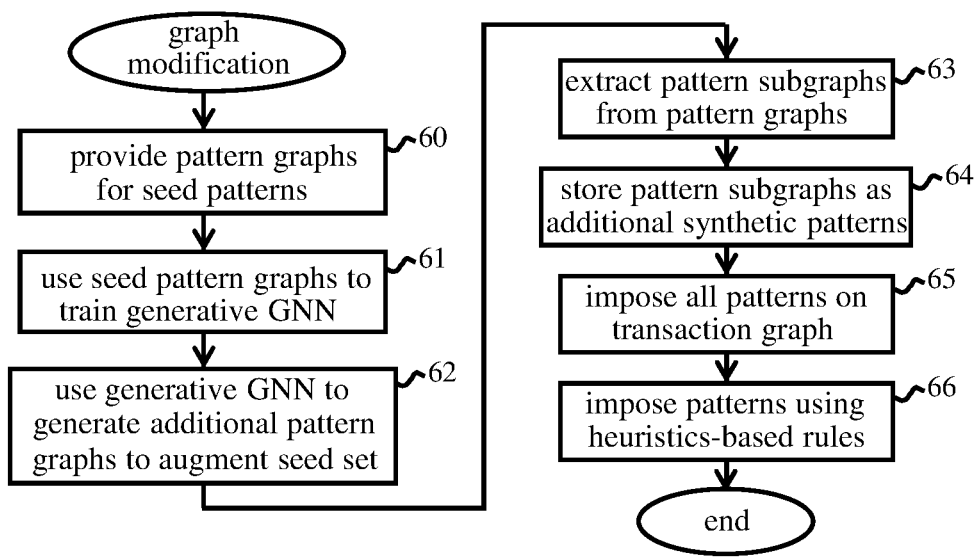
FIG. 8 indicates steps of a graph modification process in a preferred embodiment of the system.
Figure 9:
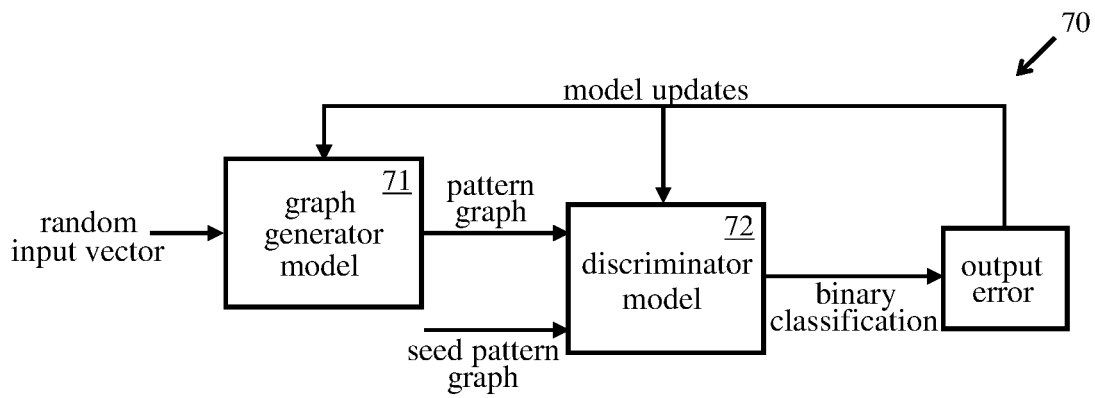
FIG. 9 illustrates training of a generative GNN used in the FIG. 8 process.

Steps of preferred methods embodying the invention will now be described in more detail. FIG. 8 illustrates operation of the graph modifier 25 in a preferred embodiment. In this embodiment, a basic "seed set" of suspect transaction patterns is prepared by experts for inclusion in the transaction graph. Step 60 of FIG. 8 represents storage in system memory 21 of a pattern graph, as described above, for each pattern in the seed set. In step 61, the graph modifier uses these seed pattern graphs to train a generative graph neural network to generate additional pattern graphs for suspect transaction patterns. Such a generative GNN can be trained in generally known manner, for example in an autoencoder architecture for graphs or in a graph-based GAN (Generative Adversarial Network). Such a GAN architecture is illustrated schematically in FIG. 9. The graph-based GAN 70 comprises a graph generator model 71 which takes a random vector as input and generates graph data for a pattern graph. The output pattern graphs are supplied to a "discriminator" model 72 which also receives seed pattern graphs as training samples. The discriminator 72 attempts to discriminate between generated pattern graphs and seed pattern graphs, classifying each input graph as either "real" (belonging to the training set) or "fake" (not belonging to the training set). The generator and discriminator models are trained in parallel via a supervised learning process, whereby the generator model progressively learns to generate realistic pattern graphs for suspect patterns. After training in the GAN architecture, the generator model 71 provides the graph-based generative GNN (GGNN 34 in FIG. 1) of graph modifier 25.

In step 62 of FIG. 8, the graph modifier uses GGNN 34 to generate pattern graphs for additional synthetic patterns which are then stored in pattern set 36 to augment the initial seed set. In this embodiment, the graph modifier then further augments the resulting pattern set. In step 63 here, for each pattern in set 36, the graph modifier extracts a plurality of pattern subgraphs, each comprising a randomly-selected subsets of nodes in that pattern graph. In step 64, these pattern subgraphs are then stored in set 36 as additional pattern graphs for synthetic patterns. One or both of pattern-augmentation steps 62 and 63 may be used to augment an initial set of seed patterns, but using both allows a large set of synthetic patterns to be generated for training model 30 with minimal expert input. Moreover, the pattern subgraphs extracted in step 63 themselves incorporate indicators of questionable activity, and including these subgraphs in the synthetic pattern set facilitates identification of subsets of an overall fraud pattern when analyzing new network 23. This allows identification of suspect activity even when the complete pattern of fraud extends beyond the network being analyzed.

In step 65, the graph modifier then modifies the transaction graph $G_R$ to include all synthetic patterns in the augmented pattern set. In step 66 of this embodiment, the graph modifier further modifies the transaction graph to include some additional synthetic patterns via heuristics-based rules defining these patterns. For example, circular transaction patterns involving a defined number of nodes can be imposed by selecting a corresponding number of nodes in the graph and applying a defined operation to values in the transaction matrices for these nodes, e.g., to include circular transfers of equal or correlated transfer amounts. As a further example, additional transfer amounts may be included in transaction matrices for individual nodes to amount to high-value, and hence potentially suspicious, transactions. Such heuristics can be applied on the graph through a pipeline where the rules are executed. The graph modifier of this embodiment thus serves as a synthetic ground-truth generator, augmenting the initial seed set of ground-truth patterns, as well as accommodating a subset of patterns based on conventional heuristics-based rules.

Figure 10:
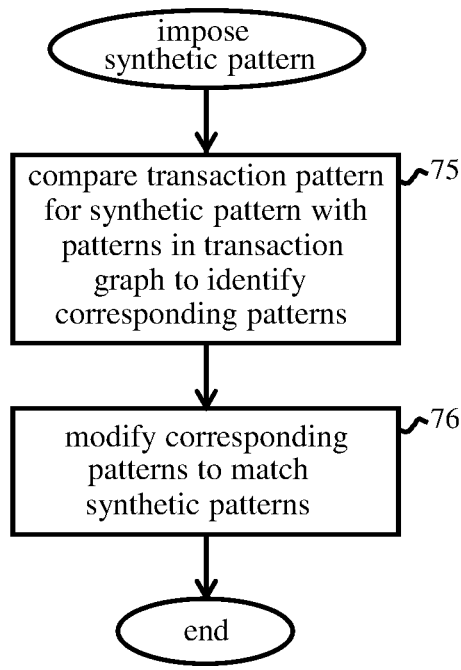
FIG. 10 shows additional steps of the graph modification process in a preferred embodiment.

FIG. 10 illustrates the process for imposing a synthetic pattern on the graph $G_N$ in this embodiment. In step 75 here, graph modifier 25 compares the pattern of transfer amounts (e.g., encoded in transaction values as described above) for nodes in the synthetic pattern graph with patterns of transaction values for nodes in $G_N$ to identify corresponding transaction patterns in the transaction graph. A pattern may be deemed "corresponding" here if transaction values are similar to values in the pattern graph, e.g., within a predefined threshold difference, and/or overall morphology of the transaction pattern is otherwise similar according to predefined criteria. In step 76, the graph modifier then modifies $G_N$ such that each corresponding transaction pattern identified in step 75 matches the pattern in the synthetic pattern graph. Modifications here may involve changing transaction values for nodes of $G_N$ and/or inserting new edges as appropriate. The FIG. 10 process is performed for each synthetic pattern in augmented pattern set 36. Multiple iterations are then performed to overlay synthetic patterns in $G_N$. This process provides a complex scenario for training of GNN model 30 while restricting modification of $G_N$ in the synthetic pattern embedding process, thus inhibiting obfuscation of real transaction data from the reference network.

Figure 11:
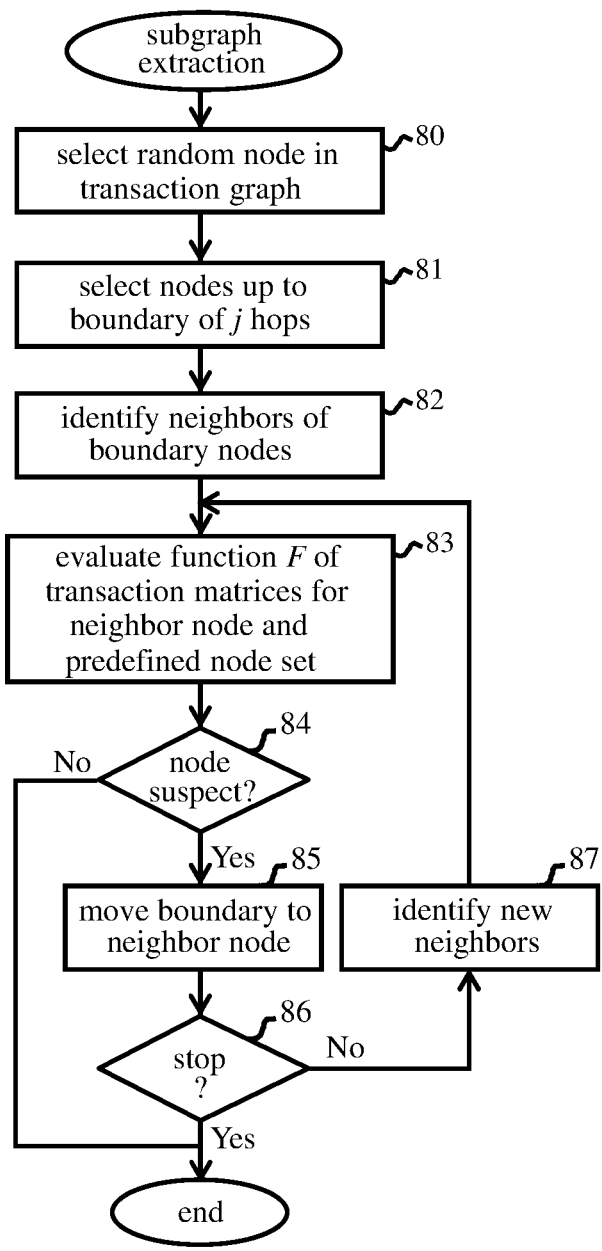
FIGS. 11 and 12 illustrate operation of a subgraph extraction process in a preferred embodiment.
Figure 12:
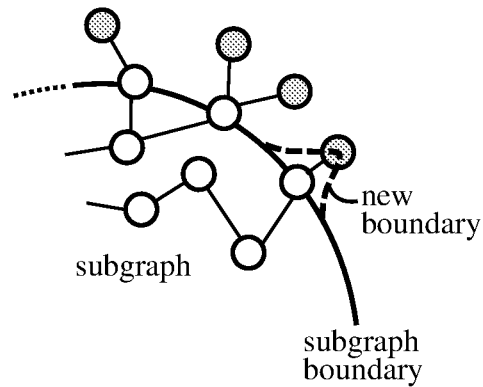

FIG. 11 illustrates the subgraph extraction process (steps 47 and 51 of FIG. 3) in a preferred embodiment. In step 80 here, the subgraph extractor 26 selects a random node in the transaction graph. In step 81, the subgraph extractor selects all nodes up to a boundary reached by a predetermined number j of hops from the randomly-selected node. In step 82, the neighboring nodes, outside the boundary, are then identified for each node on the boundary. Subsequent steps of FIG. 11 are then performed for each of these "external" neighbor nodes (nodes shaded grey in FIG. 12). For each of these nodes, the subgraph extractor decides whether to move the current boundary to that node in dependence on a function F of the transaction vectors for that node and the transaction vectors for a predefined set of nodes. This function F may be defined in various ways, the objective being to determine if the neighbor node is likely to be involved in a suspect transaction pattern with other nodes in the subgraph. For example, the function F may compare the distribution of transaction values in the transaction matrix for the neighbor node with the distribution of transaction values calculated over the transaction matrices for the predefined set of nodes. The distribution of transaction values used here may comprise the full distribution of transaction values in the transaction matrix $M_i$ or may be more-simply defined by a histogram of transaction values, e.g., obtained by summing along columns of the transaction matrix in FIG. 4. The predefined set of nodes may comprise the set of nodes on the current boundary, whereby step 83 decides whether the neighbor node's distribution is similar to the distribution calculated over the current boundary nodes. (Similarity can be assessed here using a predefined test such as a Kolmogorov—Smirnov test). If so, the neighbor node is deemed suspect in decision step 84. In step 85, the boundary is then moved to that neighbor as indicated by the dashed lines in FIG. 12. Step 86 decides if a stop condition is met (e.g., that the boundary has been moved a maximum number of times, or that the subgraph contains a maximum number of nodes). If not, step 87 identifies neighbors of the new boundary node, and operation reverts to step 83 for each identified neighbor. If, in step 84, a neighbor is not deemed suspect, then the boundary is not moved to that node. Operation is then complete for that neighbor but continues for all neighbors identified in step 82.

While an example of the function F is given above, this function may alternatively (or additionally) determine whether the neighbor node's activity is notably different to a "typical node" in the transaction graph. As an example, in some embodiments the transaction graph may include, for each node, an account-type attribute indicating one of a plurality of account types, e.g., private-user account or company account, for the account represented by that node. Where multiple such account types are defined, these can be encoded in node attributes such that similar account types have encodings with low distance. In step 83 of FIG. 11, the predefined set of nodes may then comprise the set of nodes with the same account-type attribute as the neighbor node outside the boundary. In particular, the function F may compare the distribution of transaction values in the transaction matrix for the neighbor node with the distribution of transaction values calculated over the transaction matrices for nodes with the same account type before modification of the transaction graph to include the synthetic patterns. This tests whether the neighbor node's activity is notably different to a typical node of the same type, and therefore potentially suspect. Various other tests can be envisaged here whereby the node (and possibly also edge) metadata is used to identify suspect nodes for inclusion in the subgraphs. For example, where transfer time metadata is included in $G_R$ as described below, such metadata may also be utilized in the function F to assess node activity for defining the subgraph cuts.

The subgraph extractor thus iteratively decides whether to move the boundary of a given subgraph until the stop condition is satisfied. By selectively moving boundaries in this way, subgraphs can be defined dynamically so as to include nodes likely to be involved in suspect transactions.

Figure 13:
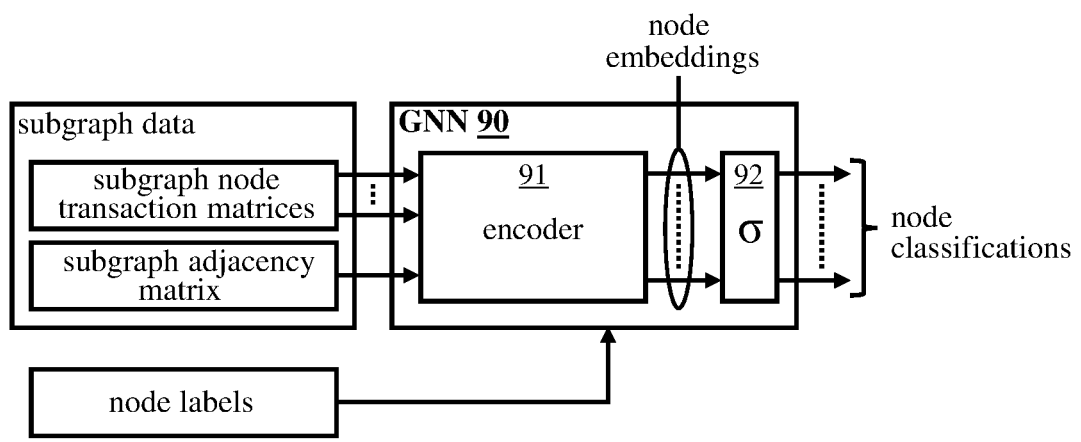
FIG. 13 is a schematic representation of a further GNN model in a preferred embodiment of the system.

FIG. 13 illustrates training of a further GNN model 90 used in model generator 27 of a preferred embodiment. This model 90 comprises an encoder 91, which produces node embeddings for a subgraph generally as described for GNN 30 of FIG. 5, and a decoder 92. In this example, an R-GCN (Recurrent Graph Convolutional Network) architecture is used for the layers of encoder 91, and decoder 92 is implemented by a SoftMax layer σ. The model generator 27 trains model 90 on the subgraphs 37 extracted from $G_R$, in this case using training labels for individual nodes of the subgraphs. Any subgraph node involved in a synthetic pattern 36 in $G_R$ is labeled as "suspect", and all other subgraph nodes are labelled "not suspect". Model 90 is thus trained to classify individual subgraph nodes as either suspect or not suspect. In step 52 of FIG. 3 here, model generator 27 supplies the new subgraphs to model 90 as well as model 30, whereby model 90 provides classifications for individual nodes of each new subgraph. The output provided by system controller 28 for network 23 can then additionally identify network nodes individually classified as suspect. Embodiments here may also aggregate the classification results from GNN models 30 and 90, e.g., using a voting scheme based on performance of the two models on test sets during training, to produce a final output indicating suspect subgraphs/nodes. In some embodiments, the system controller may also analyse transaction data for suspect nodes to assign a relative weight to nodes based on apparent contribution to suspect activity. These weights may then be indicated in output results and/or flags applied to accounts in the network.

Figure 14:
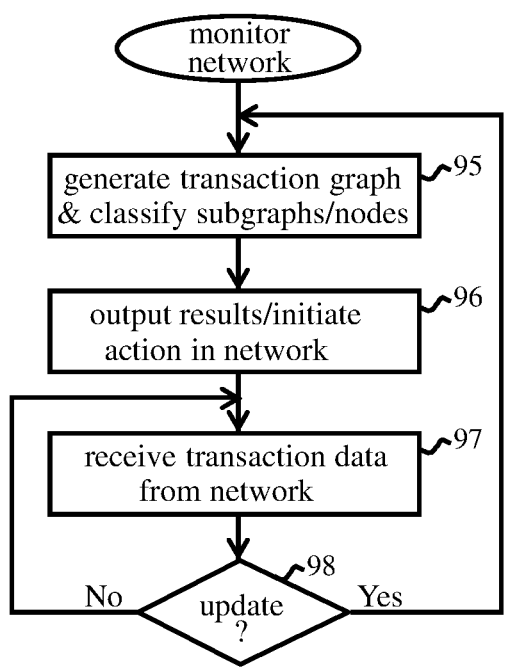
FIG. 14 indicates steps of a dynamic network monitoring process in an embodiment of the system.

FIG. 14 illustrates dynamic operation of system 20 in a financial network 23. Steps 95 and 96 here represent the FIG. 3 operation for an initial analysis and output of results for the network 23. In step 97, the system continues to receive new transaction data 38 from the network. In step 98, the system controller 28 decides if a scheduled update period (such as a month or financial quarter) has expired. If so, operation reverts to step 95, and steps 50 to 53 of FIG. 3 are repeated to regenerate and reanalyse the transaction graph $G_N$ based on the latest transaction data from the network.

It will be seen that the above embodiments offer highly efficient systems for detecting indicators of fraud over aggregates of transactions in financial networks. However, numerous changes and modifications can be made to the exemplary embodiments described. For example, transaction values in matrices $M_i$ may be calculated as various functions of the accumulated transfer amounts in the time interval $\Delta t$. Transaction graphs may also include additional metadata associated with nodes and/or edges of the graph. For instance, $G_R$ may include, for each edge, at least one edge property indicating a transfer amount and transfer time for a transfer represented by that edge. Such edge properties can then be assimilated in the message passing process for updating node states in model 30, thus encoding this information in subgraph embeddings. Additionally or alternatively, $G_R$ may include, for each edge, at least one edge property derived by Fourier analysis of the temporal distribution of transfer amounts between nodes interconnected by that edge. For example, the main modalities of the transformation may be included as edge properties. This accommodates information in the frequency domain, as well as the temporal domain, in the subgraph embeddings to assist identification of periodicity in transaction patterns.

In general, where features are described herein with reference to a method embodying the invention, corresponding features may be provided in a system/computer program product embodying the invention, and vice versa.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   generating a first transaction graph for a first financial network;
   training a generative graph neural network to generate synthetic suspect pattern graphs based on a seed set of suspect transaction pattern graphs; and
   generating a plurality of synthetic suspect transaction pattern graphs based on the trained generative graph neural network;
   comparing a pattern of transfer amounts for nodes in the synthetic suspect pattern subgraph to a first set of patterns of transaction values for nodes in the first transaction graph;
   identifying one or more corresponding transaction patterns in the first transaction graph; and
   modifying the identified one or more corresponding transaction patterns in the first transaction graph to match the synthetic suspect pattern subgraph;
   extracting a first set of one or more subgraphs from the first transaction graph, wherein each of the one or more subgraphs of the first set is comprised of a randomly-selected node and a group of nodes reachable from the randomly-selected node via corresponding edges in the transaction graph;
   training a graph neural network model to classify a subgraph as suspect with the first set of the one or more extracted subgraphs;
   generating a second transaction graph for a second financial network using a set of new transaction data;
   extracting a second set of subgraphs from the second transaction graph;
   inputting the second set of subgraphs into the trained graph neural network model for classification of each subgraph;
   classifying, by the trained graph neural network model, a first subgraph of the second financial network as suspect; and
   responsive to the first subgraph being classified as suspect, freezing accounts corresponding to nodes in the first subgraph.

2. The computer-implemented method of claim 1, further comprising:
   responsive to one or more of the subgraphs from the second set of subgraphs being classified as suspect, initiating a further action in the second financial network, wherein the further action is comprised of at least one of the following: sending an alert, indicating accounts corresponding to nodes in a subgraph to a network controller in the second financial network; and flagging accounts corresponding to nodes in a subgraph for monitoring in the second financial network.

3. The computer-implemented method of claim 1, further comprising:
   extracting a third set of subgraphs from the second financial network, wherein each node in the second transaction graph is included in at least one subgraph of the third set of subgraphs.

4. The computer-implemented method of claim 1, wherein extracting the first set of one or more subgraphs further comprises:
   selecting all nodes in the first transaction graph up to a boundary, wherein the boundary is a predetermined number of hops in the first transaction graph away from the randomly-selected node; and
   for each neighboring node outside the boundary of each node on the boundary, determining whether to move the boundary to a neighboring node outside of the boundary based on a set of vectors for the neighboring node and a set of vectors for a predefined set of nodes.

5. The computer-implemented method of claim 4, wherein determining whether to move the boundary further comprises:
   comparing a distribution of transaction values in the set of vectors for the neighboring node to the distribution of transaction values over the set of vectors for the predefined set of nodes.

6. The computer-implemented method of claim 5, wherein the predefined set of nodes is comprised of a set of nodes on the boundary.

7. The computer-implemented method of claim 5, wherein:
  each node of the first transaction graph is one of the following: account types, a private-user account, and a company account; and
  wherein the predefined set of nodes have a same account type as the neighboring node.

8. The computer-implemented method of claim 1, further comprising:
  extracting a plurality of synthetic suspect transaction pattern subgraphs from an initial set of synthetic suspect transaction patterns, wherein each set of synthetic suspect transaction patters comprises a randomly-selected subset of nodes in a synthetic suspect transaction pattern subgraph; and
  storing the plurality of synthetic suspect transaction pattern subgraphs as additional suspect transaction pattern subgraphs for synthetic suspect transaction patterns for inclusion in the first transaction graph.

9. A computer system comprising:
  one or more computer processors;
  one or more computer readable storage devices; and
  computer program instructions to:
    generate a first transaction graph for a first financial network;
    train a generative graph neural network to generate synthetic suspect pattern graphs based on a seed set of suspect transaction pattern graphs; and
    generate a plurality of synthetic suspect transaction pattern graphs based on the trained generative graph neural network;
    compare a pattern of transfer amounts for nodes in the synthetic suspect pattern subgraph to a first set of patterns of transaction values for nodes in the first transaction graph;
    identify one or more corresponding transaction patterns in the first transaction graph; and
    modify the identified one or more corresponding transaction patterns in the first transaction graph to match the synthetic suspect pattern subgraph;
    extract a first set of one or more subgraphs from the first transaction graph, wherein each of the one or more subgraphs of the first set is comprised of a randomly-selected node and a group of nodes reachable from the randomly-selected node via corresponding edges in the transaction graph;
    train a graph neural network model to classify a subgraph as suspect with the first set extracted subgraphs;
    generate a second transaction graph for a second financial network using a set of new transaction data;
    extracting a second set of subgraphs from the second transaction graph;
    inputting the second set of subgraphs into the trained graph neural network model for classification of each subgraph;
    classify, by the trained graph neural network model, a first subgraph of the second financial network as suspect; and
    responsive to the first subgraph being classified as suspect, freezing accounts corresponding to nodes in the first subgraph.

10. The computer system of claim 9, further comprising instructions to:
  responsive to one or more of the subgraphs from the second set of subgraphs being classified as suspect, initiate a further action in the second financial network, wherein the further action is comprised of at least one of the following: sending an alert, indicating accounts corresponding to nodes in the subgraph, to a network controller in the second financial network; and flagging accounts corresponding to nodes in the subgraph for monitoring in the second financial network.

11. The computer system of claim 9, further comprising instructions to:
  extracting a third set of subgraphs from the second financial network, wherein each node in the second transaction graph is included in at least one subgraph of the third set of subgraphs.

12. The computer system of claim 9, wherein extracting the first set of one or more subgraphs further comprises:
  select all nodes in the first transaction graph up to a boundary wherein the boundary is a predetermined number of hops in the first transaction graph away from the randomly-selected node; and
  for each neighboring node, outside said boundary, of each node on the boundary, determine whether to move the boundary to a neighboring node outside of the boundary, based on a set of vectors for the neighboring node and a set of vectors for a predefined set of nodes.

13. A computer program product comprising one or more computer readable storage device and program instructions sorted on the one or more computer readable storage device to:
  generate a first transaction graph for a first financial network;
  train a generative graph neural network to generate synthetic suspect pattern graphs based on a seed set of suspect transaction pattern graphs, wherein the generative graph neural network is based on a graph attention network architecture; and
  generate a plurality of synthetic suspect transaction pattern graphs based on the trained generative graph neural network;
  compare a pattern of transfer amounts for nodes in the synthetic suspect pattern subgraph to a first set of patterns of transaction values for nodes in the first transaction graph;
  identify one or more corresponding transaction patterns in the first transaction graph; and
  modify the identified one or more corresponding transaction patterns in the first transaction graph to match the synthetic suspect pattern subgraph;
  extract a first set of one or more subgraphs from the first transaction graph, wherein each of the one or more subgraphs of the first set is comprised of a randomly-selected node and a group of nodes reachable from the randomly-selected node via corresponding edges in the transaction graph;
  train a graph neural network model to classify a subgraph as suspect with the first set extracted subgraphs;
  generate a second transaction graph for a second financial network using a set of new transaction data;
  extracting a second set of subgraphs from the second transaction graph;
  inputting the second set of subgraphs into the trained graph neural network model for classification of each subgraph;
  classify, by the trained graph neural network model, a first subgraph of the second financial network as suspect; and responsive to the first subgraph being classified as suspect, freezing accounts corresponding to nodes in the first subgraph.

14. The computer program product of claim 13, further comprising program instructions to:

responsive to one or more of the subgraphs from the second set of subgraphs being classified as suspect, initiate a further action in the second financial network, wherein the further action is comprised of at least one of the following: sending an alert, indicating accounts corresponding to nodes in the subgraph, to a network controller in the second financial network; and flagging accounts corresponding to nodes in the subgraph for monitoring in the second financial network.

15. The computer program product of claim 13, further comprising program instructions to:

extract a third set of subgraphs from the second financial network, wherein each node in the second transaction graph is included in at least one subgraph of the third set of subgraphs.

* * * * *